No. 884,492. PATENTED APR. 14, 1908.
F. M. JOHNSON.
EXCAVATING MACHINE.
APPLICATION FILED MAR. 21, 1907.

Witnesses:
Inventor:
Francis M. Johnson

No. 884,492. PATENTED APR. 14, 1908.
F. M. JOHNSON.
EXCAVATING MACHINE.
APPLICATION FILED MAR. 21, 1907.

No. 884,492. PATENTED APR. 14, 1908.
F. M. JOHNSON.
EXCAVATING MACHINE.
APPLICATION FILED MAR. 21, 1907.

UNITED STATES PATENT OFFICE.

FRANCIS M. JOHNSON, OF OREGON, ILLINOIS, ASSIGNOR OF ONE-HALF TO ALPHEUS ELTON HOLCOMB, OF CHICAGO, ILLINOIS.

EXCAVATING-MACHINE.

No. 884,492.  Specification of Letters Patent.  Patented April 14, 1908.

Application filed March 21, 1907. Serial No. 363,726.

*To all whom it may concern:*

Be it known that I, FRANCIS M. JOHNSON, a citizen of the United States, residing at Oregon, in the county of Ogle and State of Illinois, have invented new and useful Improvements in Excavating-Machines, of which the following is a full, clear, concise, and exact description, reference being had to the accompanying drawing, forming a part of this specification.

My invention relates to improvements in excavating machines and particularly to that class of excavators known as bucket excavators.

One of the objects of my invention is to provide an excavating machine, the excavating device of which may be arranged to travel longitudinally of the ditch.

Another object of my machine is to provide an excavator, the excavating device of which may be arranged to dig any width desired within predetermined limits.

A further object of my invention is to provide an excavating machine in which it is unnecessary to excavate a portion of the ditch by manual labor in order that excavation can be properly started, my machine being so constructed that the excavator may be adjusted to start on the work from the top of the ground.

Another object of my invention is to provide an excavating machine by which the sides of the ditch may be given any desired slope.

Other objects of my invention will appear in the following specification and appended claims.

For the purpose of disclosing my invention, I have illustrated in the accompanying drawings, one device embodying my invention.

In the said drawings: Fig. 12 is a plan view of the sluing arrangement for the guide frame.

In order that an understanding of the relation of the various parts of my device may be obtained, I will first describe the general construction of the excavating device as a whole and the relative arrangement of the parts thereof.

In the device illustrated in the drawings upon two sets of rails 2 are arranged wheel trucks 3. These trucks have mounted thereon and extending transversely of the ditch, a bridge 4 having tracks arranged on the upper side thereof. Rollers 5 mounted in rigid truck frames operate upon the tracks and carry thereon a carriage 6 for the operating mechanism of the excavator.

The excavating device consists of a plurality of buckets carried by a suitable bucket ladder 7, the upper end of which is adjustably supported in the upper tumbler guide frame, revolubly mounted on the roller base plate of the carriage. The lower end of the ladder 7 is supported and is arranged to be adjusted vertically by means of the ladder handle 9 which in turn is carried by a ladder boom, 10 projecting from the tumbler guide frame 8. By this arrangement the ladder may be raised or lowered to vary the depth of the ditch and the angle at which the bucket may be operated may be adjusted from substantially horizontal to substantially vertical according to the bank slope required. It will be seen, from the above that the bridge 4 may be moved along the ditch on the trucks 3 as the cutting progresses, thus keeping the buckets constantly up against the face of the cut while the carriage carrying the buckets, ladder and operating machinery is moved transversely of the ditch as the dirt is removed.

For the purpose of carrying the excavated material away to the spoil banks, I provide a pair of conveyers traveling in opposite directions, on either one of which the buckets of the excavator may be arranged to dump.

The upper tumbler guide frame 8 is supported by rollers or a turn table 12 upon which, said frame may be rotated to permit the excavating buckets to operate anywhere within a circle.

To propel the trucks 3, a driving sprocket 13 is mounted upon the axle of one set of the wheels on each truck and a driving chain 14 connects these with a second sprocket 15 mounted upon a shaft 16 and carried above each truck on the bridge 4. The shaft 16 is driven by a beveled gear 17 carried at one end of a second shaft 18 which is provided at its opposite end with a sprocket 19. This sprocket is driven by a continuous drive chain 20 connected with the driving sprocket 21 operated by the engine. The carriage 6 is arranged to carry the motor 21ª for operating the various mechanisms of the excavator and also supports the upper tumbler guide frame 8.

Figure 1:
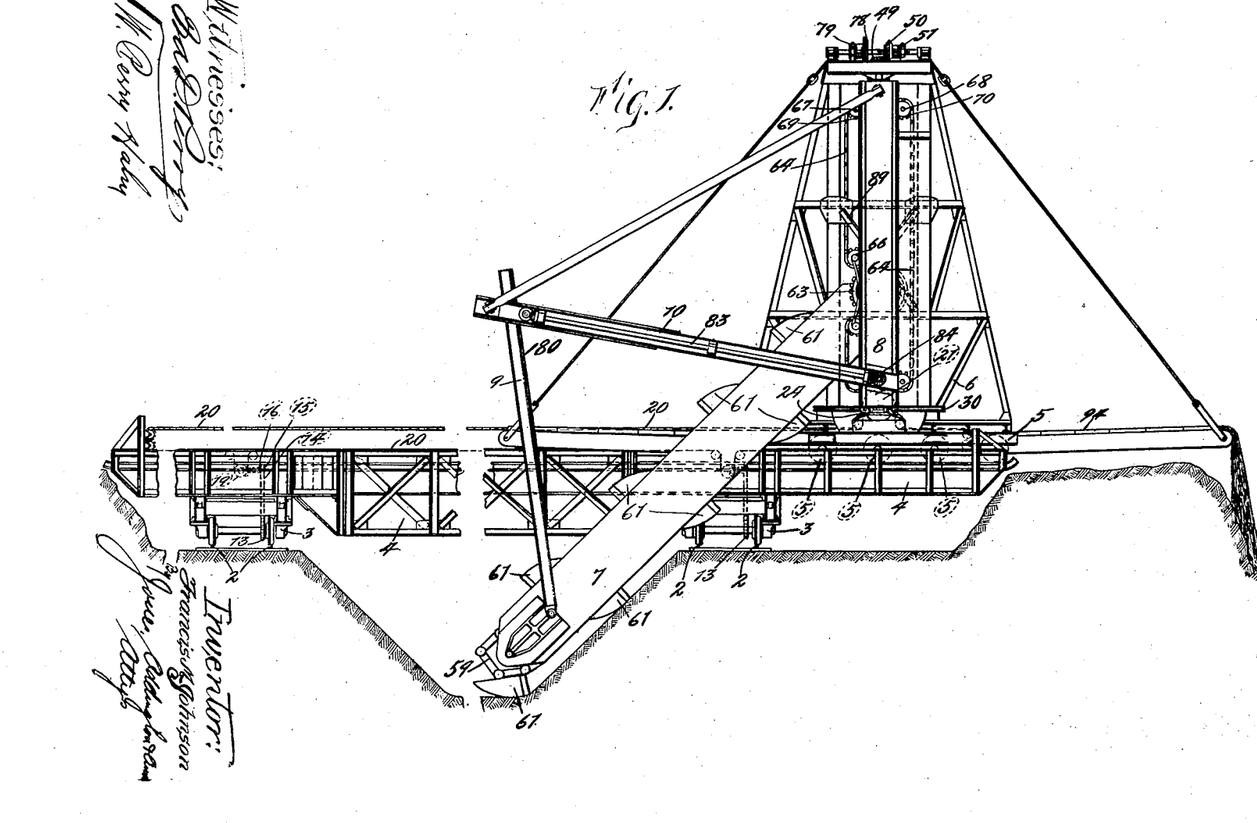
Figure 1 is a side elevation of my excavator.
Figure 2:
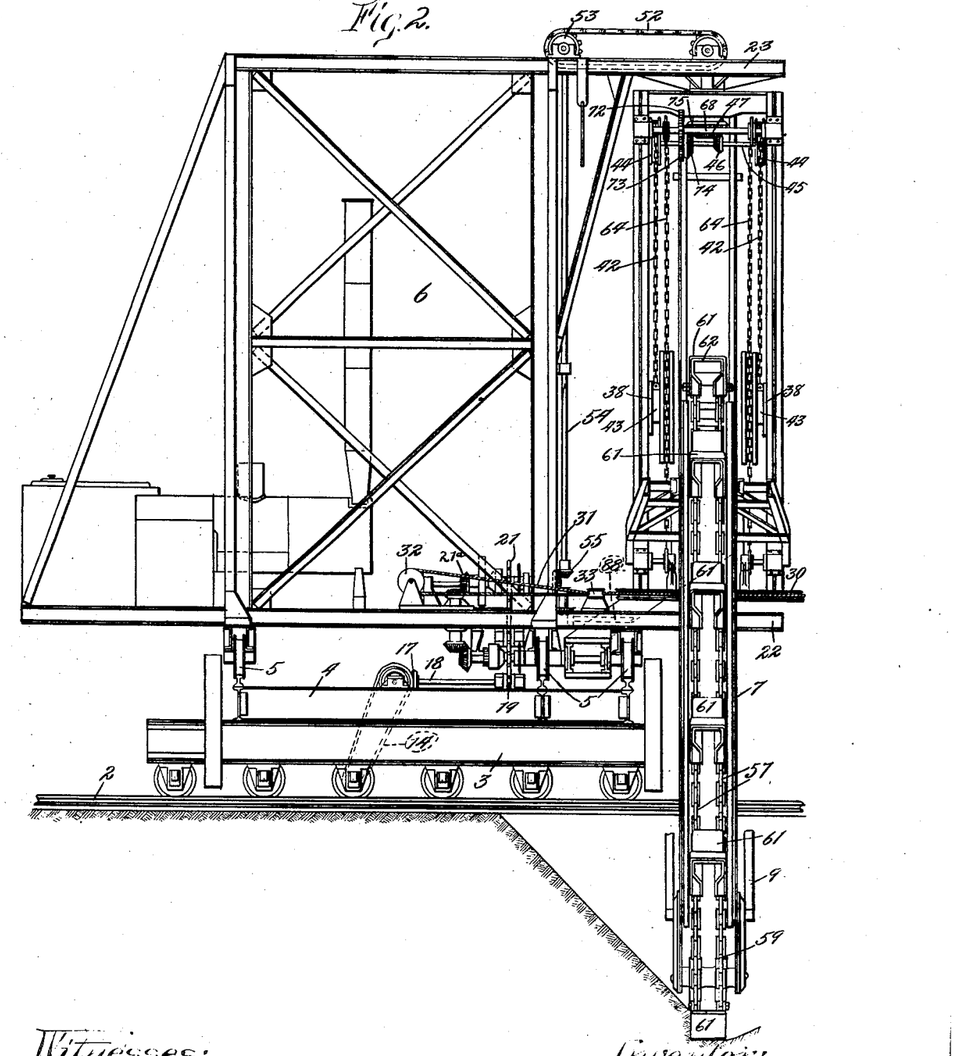
Fig. 2 is an end view thereof.
Figure 3:
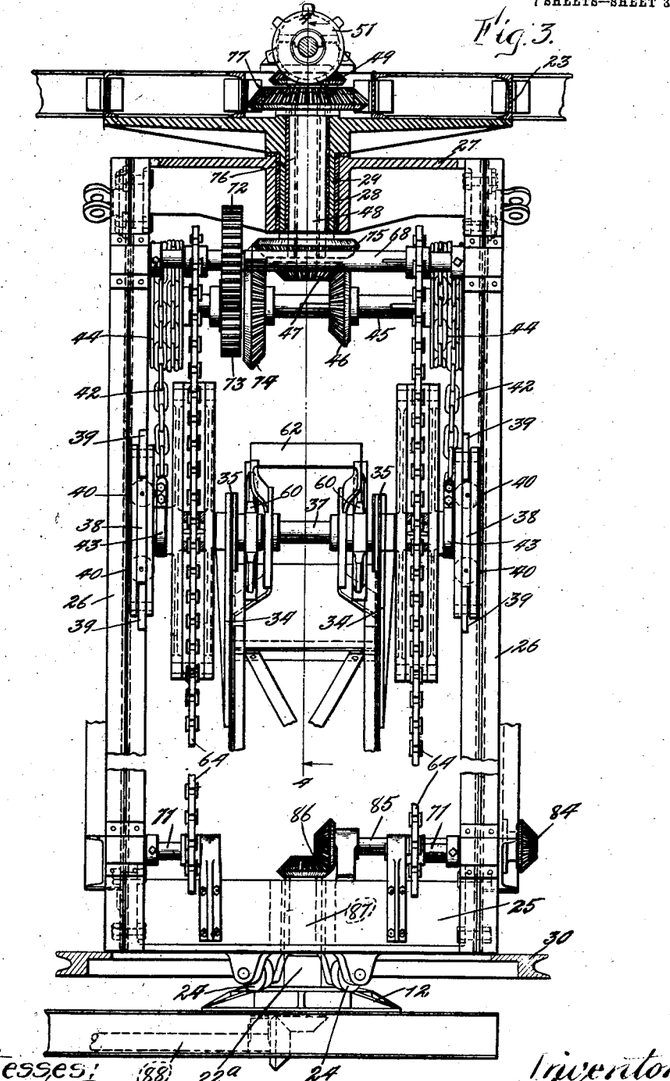
Fig. 3 is an end elevation of the upper tumbler and guide frame.
Figure 4:
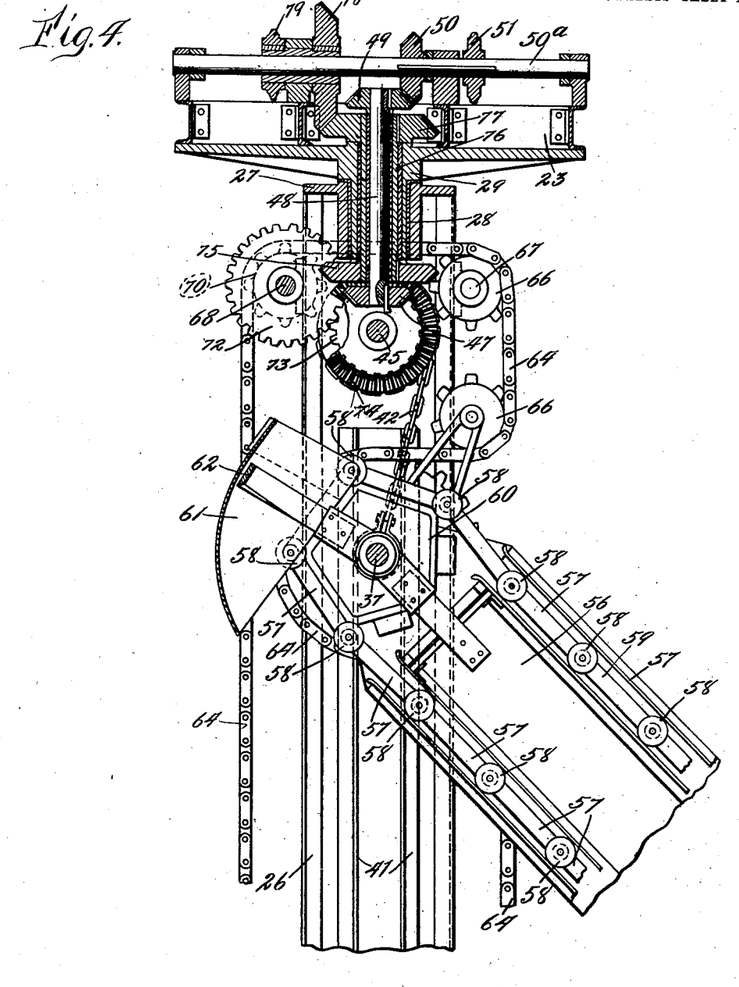
Fig. 4 is a section taken on the line 4—4 of Fig. 3.
Figures 5, 6:
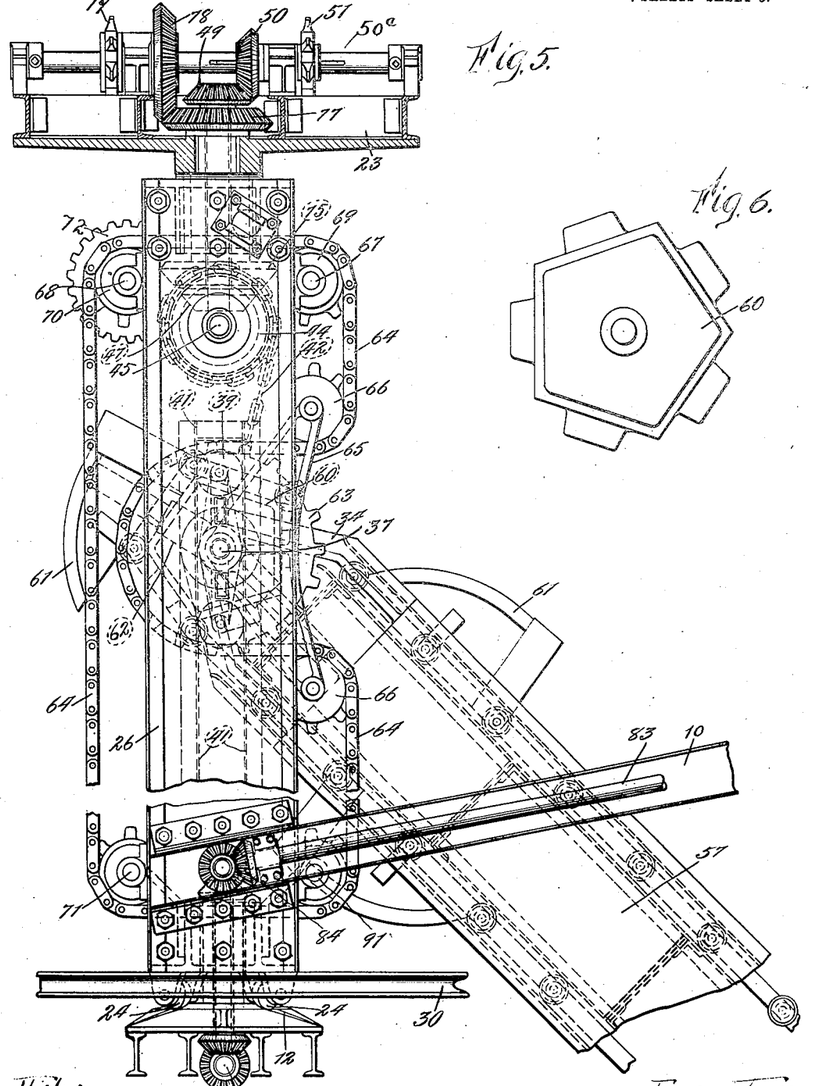
Fig. 5 is a side elevation of the upper tumbler and guide frame.
Fig. 6 is a detail of the bucket tumbler.
Figures 7, 16:
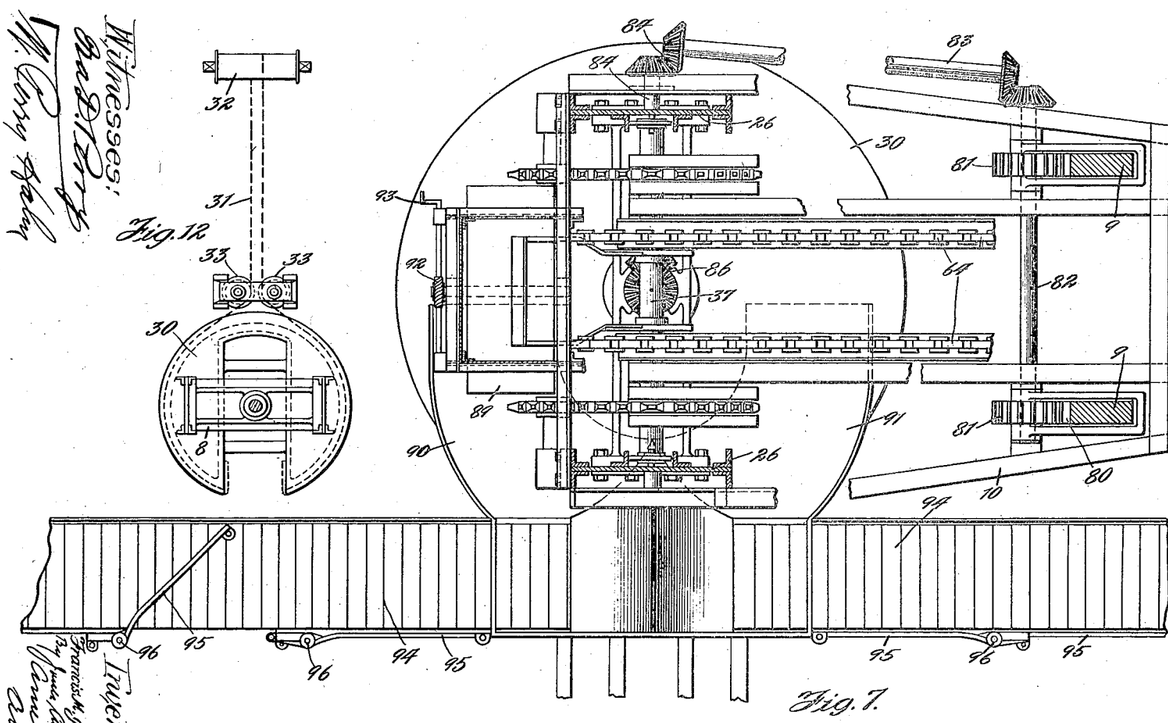
Fig. 7 is a plan of the valve, apron and conveyers.
Figure 8:
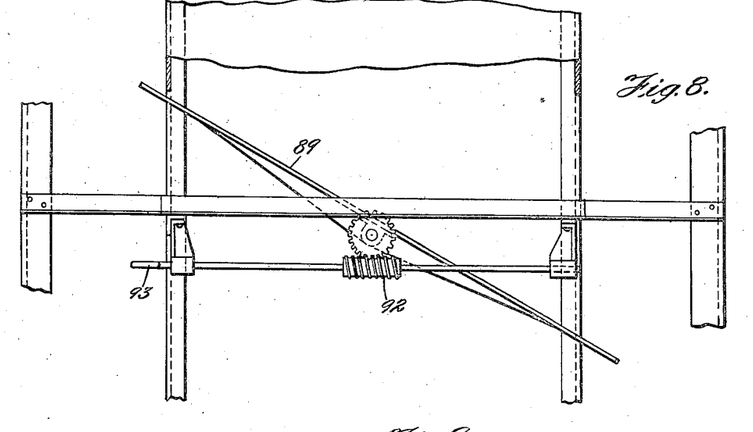
Fig. 8 is a detail view of the dumping valve.
Figure 9:
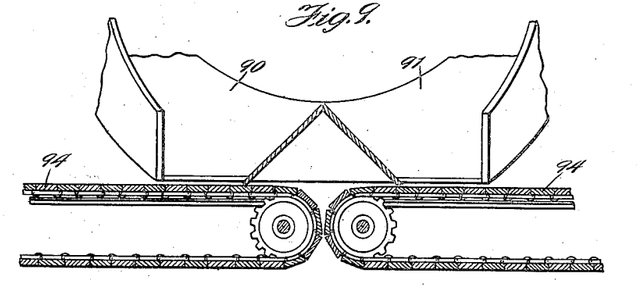
Fig. 9 is a detail section showing the dumping aprons and a portion of the conveyers.
Figure 10:
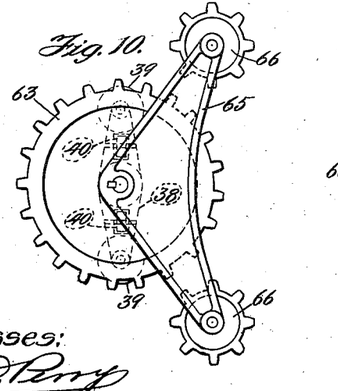
Fig. 10 is a detail view of the upper tumbler drive sprocket and the idler and roller frame.
Figure 11:
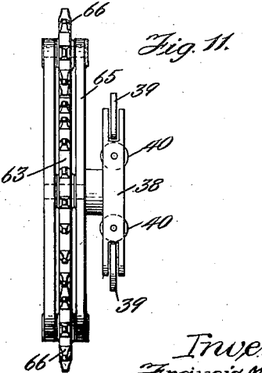
Fig. 11 is an end view of the device shown in Fig. 10.

For pivotally supporting the upper tumbler guide frame, the carriage 6 is provided with a lower platform 22 and an upper pintle bearing 22ª which project beyond the main frame, (see Fig. 2) and between which the tumbler guide is mounted upon a base-plate or turn table 12, secured to the platform 22 and provided with a track upon which the rollers 24 of the connecting cross beam at the bottom of the tumbler guide frame 8 operate. The guide frame 8 comprises a bottom cross member 25, a pair of vertically extending guide members 26 and an upper cross member 27 which constitute a framework within which is mounted the upper tumbler of the bucket chain and the operating mechanism for the buckets. The upper cross member of the guide frame 8 is provided with a socket 28 in which is arranged to fit a pivot member 29 secured to the under side of the platform 23.

Secured to the bottom of the guide frame lower cross beam and pintle bearing, is a swing circle sheave 30, around which passes a cable 31 which is operated from a drum 32 mounted on the carriage 6 and driven through the operating motor of the excavator for rotating the upper tumbler guide frame 8. A pair of idler pulleys 33 are mounted upon the lower platform 22 to guide the cable and prevent the cable from spreading. A suitable mechanism (not shown) is introduced between the drum 32 and the driving shaft of the engine, whereby the drum may be rotated in two directions.

The upper ends of the ladder 7 terminate in a pair of arms 34 provided with bearings 35 mounted upon the upper tumbler shaft. The journals at the outer ends of the shaft are provided with supports 38 carrying transversely extending rollers 39 and longitudinally extending rollers 40 which bear against the vertical members 26 and a pair of tracks 41 mounted upon said members, respectively. This arrangement forms a vertical guide for the journals of the shaft 37. The journals are raised and lowered by means of chains 42 having one end secured to collars 43 passing around the journals and the other end wound upon drums 44 mounted upon a shaft 45 stationarily supported at the upper end of the tumbler guide frame 8.

For the purpose of revolving the shaft 45 to raise or lower the upper tumbler shaft 37, a beveled gear 46 is keyed upon the shaft 45 and meshes with a bevel gear 47 mounted on the lower end of a vertical shaft 48 journaled in the pivot 29. The upper end of the shaft 48 carries a second bevel gear 49 which in turn meshes with a bevel gear 50 mounted on a shaft 50ª journaled upon the upper platform 23. The shaft 50ª is provided with a sprocket 51 which is driven by means of a sprocket chain 52 from the sprocket 53 mounted upon a horizontal shaft, driven by a beveled gear connected with a vertical driving shaft 54, the lower end of which shaft has a beveled driving connection 55 with driving shaft of the engine.

A suitable clutching and reversing mechanism (not shown) is provided on the engine driving shaft whereby the drum shaft 45 may be caused to rotate in either direction. It is apparent that according to the direction in which the shaft 45 is operated, the upper end of the ladder guide will be raised or lowered.

The bucket ladder 7 comprises a pair of parallel members 56 on the inner side of which are formed tracks or guides 57 within which operate the rollers 58 of the bucket chain 59. The bucket chain 59 is driven by means of the rotating tumblers 60, keyed to the upper tumbler shaft. Buckets 61, one form of which is illustrated in the drawings, are secured at regular intervals to the links of the chain 59. The lower end of the chain 59 passes over similar tumblers mounted in the lower end of the ladder frame 7. As the buckets reach the top of their course, due to the shape of the tumblers 60, they are turned bottom side up and dumped, and as they pass over the tumblers 60 a scraper 62 projecting from the collars 35 scrapes out any dirt that sticks to the bottom of the bucket.

For driving the tumblers 60 a pair of sprockets 63 are keyed upon the shaft 45 and are driven by driving chains 64. In order that the chains 64 may always be operative, irrespective of the position of the sprockets 63, supporting frames 65 are mounted upon shaft 37 and are provided at their upper and lower ends with idler sprockets 66 over which the chains pass before they are looped over the sprockets 63.

At the upper end of the tumbler guide frame are mounted two shafts 67 and 68 which carry sprocket wheels 69 and 70 over which the sprocket chains 64 pass. A set of shafts 71 is provided at the lower end of the frame having similar sprocket wheels over which the driving chains 64 pass. Motion is transmitted to the driving chains 64 by rotating the shafts 68. This is accomplished by a gear wheel 72 arranged to mesh with gear wheel 73 loosely mounted upon shaft 45 and having secured on its hub a bevel gear 74 in turn meshing with a bevel gear 75 mounted on the lower end of the quill shaft 76 journaled in the pivot pintle 29. The upper end of the quill shaft 76 carries a bevel 77 arranged to mesh with a bevel gear 78 driven by its sprocket wheel 79.

The sprocket wheel 79 is driven by a second chain 52 which in turn receives its motion from a second shaft 54 operated in the same manner as has been described with respect to the raising and lowering mechanism. The lower end of the ladder 7 is raised and lowered by the ladder handle 9 which is provided with a rack 80 operated by a gear 81 mounted upon the shipper shaft 82 carried at the outer end of the boom 10. This shaft is driven by a shaft 83 extending along the boom 10 and having a bevel connection with the shaft 82. The inner end of the shaft 83 has a beveled gear connection 84 with a shaft 85 mounted upon the lower end of the upper tumbler guide frame 8 and this shaft is driven through a bevel gear connection 86 with a vertically extending shaft 87 extending up through the turn-table pintle bearing 22ª. The lower end of the shaft 87 has a bevel gear connection with a horizontal shaft 88 driven from the engine. A clutching and reversing mechanism (not shown) is provided on the engine for throwing this mechanism into and out of operative rotation with the motor.

The dirt emptied from the buckets 61 drops down upon a table 89 mounted on the carriage 6. This table is pivoted so that it can be inclined from the horizontal on either side of its pivot so that the dirt may pass to either side of the aprons 90 or 91. The table 89 is tilted by means of worm gear 92 operated by the handle 93. The aprons 90 and 91 are shaped and slope towards a pair of traveling conveyers 94 which travel in opposite directions and are operated by any suitable operating mechanism.

In order that the dirt may be dumped from the conveyers at any desired point, one side of the conveyers is provided with a series of gates 95 hinged at 96 to permit their being adjusted obliquely across the top of the conveyer, whereby as the dirt is carried along by the conveyer, it will strike the oblique gate and be deflected off the side of the conveyer.

In operation, the buckets of the excavator are arranged longitudinally of the ditch and lowered until they rest upon the surface of the ground, the buckets are then started to digging. While the digging chain is in motion, transverse motion is given to the supporting ladder carriage and therefore to the bucket ladder, which causes the digging buckets to cut and remove the earth with their sides as well as their front edges, and as the ladder traverses the proposed bottom width of the ditch. Having reached its limit of motion sidewise, the ends of the bucket ladder are lowered for another cut and the moving carriage started back on its course transversely of the ditch. This leaves the walls of the ditch vertical and after the ditch is completed, or a predetermined length of the ditch is cut, the buckets are turned transversely of the ditch and arranged at the proper angle to cut the slant desired, and again lowered to cut the sides of the ditch.

While I have described the carriage for the operating mechanism of the excavator as being operative on a bridge, it will be understood that I do not wish to be limited to this construction as the carriage may be used independently of the bridge, as for instance, the carriage itself may operate on rails extending along the side of the ditch.

When used without the bridge, the carriage is preferably provided with a second set of wheels extending at right angles and adjustable to permit the carriage to rest upon either set of wheels, whereby the carriage or excavating mechanism carried thereby, may operate upon rails extending longitudinally of the ditch, or upon rails extending at right angles to the ditch. The rails extending at right angle to the ditch may extend to a second set of transversely extending rails, upon which the carriage may be arranged to operate after the operation of cutting is performed while the carriage is upon the first set of rails, and if desired, a still further set of rails may be placed longitudinally of the ditch to which the carriage may be shifted after the second cut, thus permitting the ditch to be cut in the width desired.

When the carriage is used without the bridge, it is preferable to remove the dirt to the spoil bank by means of trains of cars, wagons or the like.

While I have described one specific form of my invention, it will be understood that I do not wish to be limited thereby, as various modifications and changes may be made without departing from the spirit of my appended claims.

I claim:

1. In an excavator, the combination with a carriage, of a bucket ladder supported thereby having the outer end thereof extending downwardly and arranged to have the buckets travel thereon so that the cut of each bucket extends across the entire face of the bank, and means for adjusting each end of the ladder independently of the other end.

2. In an excavator, the combination with a carriage, of a bucket ladder supported thereby having the outer end thereof extending downwardly and arranged to have the buckets travel thereon so that the cut of each bucket extends across the entire face of the bank, and means for adjusting the height of each end of the ladder independently of the other end.

3. In an excavator, the combination with a carriage, of a bucket ladder supported thereby and arranged to have the buckets travel thereon so that the cut of each bucket extends across the entire face of the bank, means for adjusting each end of the ladder independently of the other end, and means for sluing the ladder.

4. In an excavator, the combination with a carriage, of a bucket ladder supported thereby and arranged to have the buckets travel thereon so that the cut of each bucket extends across the entire face of the bank, means for adjusting the height of each end of the ladder independently of the other end, and means for sluing the ladder.

5. In an excavator, the combination with a bridge, of a carriage movable thereon, a bucket ladder supported thereby having the outer end thereof extending downwardly and arranged to have the buckets travel thereon so that the cut of each bucket extends across the entire face of the bank, and means for adjusting both ends of said ladder to vary the slope of the back.

6. In an excavator, the combination with a bridge, of a carriage movable thereon, a bucket ladder supported thereby having the outer end thereof extending downwardly and arranged to have the buckets travel thereon so that the cut of each bucket extends across the entire face of the bank, and means for adjusting the height of the ends of the ladder to vary the slope of the back.

7. In an excavator, the combination with a bridge, of a carriage movable thereon, a bucket ladder supported thereby having the outer end thereof extending downwardly and arranged to have the buckets travel thereon so that the cut of each bucket extends across the entire face of the bank, and means for adjusting each end of the ladder independently of the other end.

8. In an excavator, the combination with a bridge, of a carriage movable thereon, a bucket ladder supported thereby having the outer end thereof extending downwardly and arranged to have the buckets travel thereon so that the cut of each bucket extends across the entire face of the bank, and means for adjusting the height of each end of the ladder independently of the other end.

9. In an excavator, the combination with a bridge, of a carriage movable thereon, a bucket ladder supported thereby and arranged to have the buckets travel thereon so that the cut of each bucket extends across the entire face of the bank, means for adjusting both ends of said ladder, and means for sluing the ladder.

10. In an excavator, the combination with a bridge, of a carriage movable thereon, a bucket ladder supported thereby and arranged to have the buckets travel thereon so that the cut of each bucket extends across the entire face of the bank, means for adjusting the height of the ends of the ladder, and means for sluing the ladder to vary the slope of the back.

11. In an excavator, the combination with a bridge, of a carriage movable thereon, a bucket ladder supported thereby and arranged to have the buckets travel thereon so that the cut of each bucket extends across the entire face of the bank, means for adjusting each end of the ladder independently of the other end, and means for sluing the ladder.

12. The combination with excavating buckets, of a table on which the same are arranged to dump, adjustable to throw the dirt in different directions on conveyers arranged to receive it.

13. The combination with excavating buckets, of a plurality of conveyers, and a table adjustable to throw the dirt discharged from said buckets upon any of said conveyers.

14. The combination with excavating buckets, of a plurality of conveyers operating in different directions, and a table adjustable to throw the dirt discharged from said buckets upon any of said conveyers.

15. The combination with excavating buckets, of means for sluing said buckets, and a table on which said buckets are arranged to dump, adjustable to throw the dirt in different directions.

16. The combination with excavating buckets, of means for sluing said buckets, a plurality of conveyers, and a table adjustable to throw the dirt discharged from said buckets upon any of said conveyers.

17. The combination with excavating buckets, of means for sluing said buckets, a plurality of conveyers operating in different directions, and a table adjustable to throw the dirt discharged from said buckets upon any of said conveyers.

18. In an excavating machine, the combination with a face digging bucket ladder, of means for moving the ends of the ladder independently or simultaneously, and a rigid guide for the upper end of the ladder.

19. In an excavating machine, the combination with a face digging bucket ladder, of means for raising and lowering the ends of the ladder simultaneously or independently and a rigid guide for the upper end of the ladder.

20. In an excavating machine, the combination with a face digging bucket ladder, of means for moving the ends of the ladder independently or simultaneously and means for moving one end of the ladder laterally and oscillatory about the point of suspension of the other end.

21. In an excavating machine, the combination with a face digging bucket ladder, of means for raising or lowering the ends of the ladder independently or simultaneously and means for moving one end of the ladder laterally and oscillatory about the point of suspension of the other end.

22. In an excavating machine, the combination with a face digging bucket ladder, of means for moving the ends of the ladder independently or simultaneously, a rigid guide for one end of the ladder and means for moving one end of said ladder laterally and oscillatory about the point of suspension of the other end.

23. In an excavating machine, the combination with a face digging bucket ladder, of means for raising or lowering the ends of the ladder independently or simultaneously, a rigid guide for one end of the ladder, and means for moving one end of the ladder laterally and oscillatory about the point of suspension of the other end.

24. In an excavating machine, the combination with a face digging bucket ladder, of means for moving the ends of the ladder independently or simultaneously and means for moving the ladder across the excavation from side to side to vary the width of the excavation.

25. In an excavating machine, the combination with a face digging bucket ladder, of means for raising or lowering the ends of the ladder independently or simultaneously and means for moving the ladder across the excavation from side to side to vary the width of the excavation.

26. In an excavating machine, the combination with a face digging bucket ladder, of means for moving the ends of the ladder independently or simultaneously, means for moving the ladder across the excavation from side to side to vary the width of the excavation and a rigid guide for one end of the ladder.

27. In an excavating machine, the combination with a face digging bucket ladder, of means for raising or lowering the ends of the ladder independently or simultaneously, means for moving the ladder across the excavation from side to side to vary the width of the excavation and a rigid guide for one end of the ladder.

28. In an excavating machine, the combination with a face digging bucket ladder having the outer end downwardly extending, of means for moving the ends of the ladder independently or simultaneously and means for moving the ladder longitudinally of the excavation to vary the length of the excavation.

29. In an excavating machine, the combination with a face digging bucket ladder having the outer end downwardly extending, of means for raising or lowering the ends of the ladder and means for moving the ladder longitudinally of the excavation to vary the length of the excavation.

30. In an excavating machine, the combination with a face digging bucket ladder, of means for moving the ends of the ladder independently or simultaneously, means for moving the ladder longitudinally of the excavation to vary the length of the excavation and a rigid guide for the upper end of the ladder.

31. In an excavating machine, the combination with a face digging bucket ladder, of means for raising or lowering the ends of the ladder independently or simultaneously, means for moving the ladder longitudinally of the excavation to vary the length of the excavation and a rigid guide for the upper end of the ladder.

32. In an excavating machine, the combination with a face digging bucket ladder, of means for moving the ends of the ladder independently or simultaneously, means for moving the ladder across the excavation from side to side to vary the width of the excavation and means for moving the ladder longitudinally of the excavation to vary the length of the excavation.

33. In an excavating machine, the combination with a face digging bucket ladder, of means for raising or lowering the ends of the ladder independently or simultaneously, means for moving the ladder across the excavation from side to side to vary the width of the excavation and means for moving the ladder longitudinally of the excavation to vary the length of the excavation.

34. In an excavating machine, the combination with a face digging bucket ladder, of means for moving the ends of the ladder independently or simultaneously, means for moving the ladder across the excavation from side to side to vary the width of the excavation and means for moving the ladder longitudinally of the excavation to vary the length of the excavation and a rigid guide for one end of the ladder.

35. In an excavating machine, the combination with a face digging bucket ladder, of means for raising or lowering the ends of the ladder independently or simultaneously, means for moving the ladder across the excavation from side to side to vary the width of the excavation, means for moving the ladder longitudinally of the excavation to vary the length of the excavation and a rigid guide for one end of the ladder.

36. In an excavating machine, the combination with a face digging bucket ladder, of means for moving the ends of the ladder independently or simultaneously, means for moving the ladder across the excavation to vary the width of the excavation and means for moving one end of the ladder laterally and oscillatory about the point of suspension of the other end.

37. In an excavating machine, the combination with a face digging bucket ladder, of means for raising or lowering the ends of the ladder independently or simultaneously, means for moving the ladder across the excavation to vary the width of the excavation and means for moving one end of the ladder laterally and oscillatory about the point of suspension of the other end.

38. In an excavating machine, the combination with a face digging bucket ladder, of means for moving the ends of the ladder independently or simultaneously, means for moving the ladder across the excavation to vary the width of the excavation, a rigid guide for one end of the ladder and means for moving one end of the ladder laterally and oscillatory about the point of suspension of the other end.

39. In an excavating machine, the combination with a face digging bucket ladder, of means for raising or lowering the ends of the ladder independently or simultaneously, means for moving the ladder across the excavation to vary the width of the excavation, a rigid guide for one end of the ladder and means for moving one end of the ladder laterally and oscillatory about the point of suspension of the other end.

40. In an excavating machine, the combination with a face digging bucket ladder, of means for moving the ends of the ladder independently or simultaneously, means for moving the ladder longitudinally of the excavation to vary the length of the excavation and means for moving one end of the ladder laterally and oscillatory about the point of suspension of the other end.

41. In an excavating machine, the combination with a face digging bucket ladder, of means for raising or lowering the ends of the ladder independently or simultaneously, means for moving the ladder longitudinally of the excavation to vary the length of the excavation and means for moving one end of the ladder laterally and oscillatory about the point of suspension of the other end.

42. In an excavating machine, the combination with a face digging bucket ladder, of means for moving the ends of the ladder independently or simultaneously, means for moving the ladder longitudinally of the excavation to vary the length of the excavation, a rigid guide for one end of the ladder, and means for moving one end of the ladder laterally and oscillatory about the point of suspension of the other end.

43. In an excavating machine, the combination with a face digging bucket ladder, of means for raising or lowering the ends of the ladder independently or simultaneously, means for moving the ladder longitudinally of the excavation to vary the length of the excavation, a rigid guide for one end of the ladder, and means for moving one end of the ladder laterally and oscillatory about the point of suspension of the other end.

44. In an excavating machine, the combination with a face digging bucket ladder, of means for moving the ends of the ladder independently or simultaneously, means for moving the ladder across the excavation to vary the width of the excavation, means for moving the ladder longitudinally of the excavation to vary the length of the excavation and means for moving one end of the ladder laterally and oscillatory about the point of suspension of the other end.

45. In an excavating machine, the combination with a face digging bucket ladder, of means for raising or lowering the ends of the ladder independently or simultaneously, means for moving the ladder across the excavation to vary the width of the excavation, means for moving the ladder longitudinally of the excavation to vary the length of the excavation and means for moving one end of the ladder laterally and oscillatory about the point of suspension of the other end.

46. In an excavating machine, the combination with a face digging bucket ladder, of means for moving the ladder independently or simultaneously, means for moving the ladder across the excavation to vary the width of the excavation, means for moving the ladder longitudinally of the excavation to vary the length of the excavation, a rigid guide for one end of the ladder and means for moving one end of the ladder laterally and oscillatory about the point of suspension of the other end.

47. In an excavating machine, the combination with a face digging bucket ladder, of means for raising or lowering the ends of the ladder independently or simultaneously, means for moving the ladder across the excavation to vary the width of the excavation, means for moving the ladder longitudinally of the excavation to vary the length of the excavation, a rigid guide for one end of the ladder and means for moving one end of the ladder laterally and oscillatory about the point of suspension of the other end.

48. In an excavating machine, the combination with a face digging bucket ladder having the upper tumbler end nearest the main supporting body of the machine, of means for raising or lowering the ends of the ladder independently or simultaneously at will to permit excavating a ditch to the desired depth and sloping the banks to any desired angle.

49. In an excavating machine, the combination with a face digging bucket ladder having one tumbler end nearest the main supporting body of the machine, of means for raising or lowering the ends of the ladder independently or simultaneously at will to permit excavating a ditch to the desired depth and sloping the banks to any desired angle, and means for moving the ladder across the ditch to vary the width of the ditch.

50. In an excavating machine, the combination with a face digging bucket ladder having the upper tumbler end nearest the main supporting body of the machine, of means for raising or lowering both ends of the ladder independently or simultaneously at will to permit excavating a ditch to the desired depth and sloping the banks to any desired angle, and means for moving the ladder longitudinally of the ditch to vary the length of the ditch.

51. In an excavating machine, the combination with a face digging bucket ladder having one upper tumbler end nearest the main supporting body of the machine, of means for raising or lowering the ends of the ladder independently or simultaneously at will to permit excavating a ditch to the desired depth and sloping the banks to any desired angle, means for moving the ladder across the ditch to vary the width of the ditch, and means for moving the ladder longitudinally of the ditch to vary the length of the ditch.

52. In an excavating machine, the combination with a face digging bucket ladder having the upper tumbler end nearest the main supporting body of the machine, of means for raising and lowering both ends of the ladder at will to permit excavating a ditch to the desired depth and sloping the bank to any desired angle.

53. In an excavating machine, the combination with a face digging bucket ladder arranged to dump toward the machine and having one end nearest the point of dumping of the buckets, of means for raising or lowering the ends of the ladder independently or simultaneously at will to permit excavating a ditch to the desired depth and sloping the banks to any desired angle.

54. In an excavating machine, the combination with a face digging bucket ladder having one end nearest the point of dumping of the buckets, of means for raising or lowering the ends of the ladder independently or simultaneously at will to permit excavating a ditch to the desired depth and sloping the banks to any desired angle and means for moving the ladder across the ditch to vary the width of the ditch.

55. In an excavating machine, the combination with a face digging bucket ladder arranged to dump toward the machine and having one end nearest the point of dumping of the buckets, of means for raising or lowering the ends of the ladder independently or simultaneously at will to permit excavating a ditch to the desired depth and sloping the banks to any desired angle, and means for moving the ladder longitudinally of the ditch to vary the length of the ditch.

56. In an excavating machine, the combination with a face digging bucket ladder having one end nearest the point of dumping of the buckets, of means for raising or lowering the ends of the ladder independently or simultaneously at will to permit excavating a ditch to the desired depth and sloping the banks to any desired angle, means for moving the ladder across the ditch to vary the width of the ditch, and means for moving the ladder longitudinally of the ditch to vary the length of the ditch.

57. In an excavating machine, the combination with a face digging bucket ladder having the dumping end nearest the main supporting body of the machine, of means for raising and lowering both ends of the ladder at will to permit excavating a ditch to the desired depth and sloping the banks to any desired angle.

58. In an excavating machine, the combination with a face digging bucket ladder having the upper tumbler end nearest to the main supporting body of the machine, of means for raising and lowering the ends of the ladder independently at will to permit excavating a ditch to the desired depth and sloping the banks thereof to any desired angle.

59. In an excavating machine, the combination with a face digging bucket ladder having the dumping end nearest to the main supporting body of the machine, of means for raising and lowering the ends of the ladder independently to permit excavating a ditch to the desired depth and sloping the banks thereof to any desired angle.

60. In an excavating machine, the combination with a face digging bucket ladder having the upper tumbler end nearest to the main supporting body of the machine, and means for independently or simultaneously raising and lowering both ends of the ladder at will, of an endless series of buckets mounted on rollers arranged to run in rigid guides secured to the ladder, whereby the buckets are held to the work rigidly and whereby the buckets may excavate the ditch to the desired depth and slope the banks thereof at any desired angle.

61. In an excavating machine, the combination with a face digging bucket ladder, of means for raising or lowering the lower end of the ladder oscillatory about the upper point of suspension of the ladder, means for raising and lowering the upper end of the ladder, and a rigid guide for the upper end of the ladder.

62. In an excavating machine, the combination with a face digging bucket ladder having one tumbler end nearest the main supporting body of the machine, of means for raising and lowering the ends of the ladder independently or simultaneously to permit excavating a ditch to the desired depth and sloping the banks to any desired angle, and means for moving one end of the ladder laterally and oscillatory about the point of suspension of the other end of the ladder.

63. In an excavating machine, the combination with a face digging bucket ladder having one tumbler end nearest the main supporting body of the machine, of means for raising or lowering the ends of the ladder independently or simultaneously to permit excavating a ditch to the desired depth and sloping the banks to any desired angle, means for moving one end of the ladder laterally and oscillatory about the point of suspension of the other end of the ladder and means for moving the ladder across the ditch.

64. In an excavating machine, the combination with a face digging bucket ladder having one tumbler end nearest the main supporting body of the machine, of means for raising or lowering the ends of the ladder independently or simultaneously to permit excavating a ditch to the desired depth and sloping the banks to any desired angle, means for moving one end of the ladder laterally and oscillatory about the point of suspension of the other end of the ladder and means for moving the ladder longitudinally of the ditch to vary the length of the ditch.

65. In an excavating machine, the combination with a face digging bucket ladder having one tumbler end nearest the main supporting body of the machine, of means for raising or lowering the ends of the ladder independently or simultaneously to permit excavating a ditch to the desired depth and sloping the banks to any desired angle, means for moving one end of the ladder laterally and oscillatory about the point of suspension of the other end of the ladder, means for moving the ladder across the ditch to vary the width of the ditch and means for moving the ladder longitudinally of the ditch to vary the length of the ditch.

66. In an excavating machine, the combination with a face digging bucket ladder having the upper tumbler end nearest the main supporting body of the machine, of means for raising and lowering the ends of the ladder independently or simultaneously to permit excavating a ditch to the desired depth and sloping the banks at any desired angle, and means for moving the lower end of the ladder laterally or oscillatory about the upper point of suspension of the ladder.

67. In an excavating machine, the combination with a face digging bucket ladder having one tumbler end nearest the point of dumping of the buckets, of means for raising or lowering the ends of the ladder independently or simultaneously and means for moving one end of the ladder laterally and oscillatory about the point of suspension of the other end of the ladder.

68. In an excavating machine, the combination with a face digging bucket ladder having one tumbler end nearest the point of dumping of the buckets, of means for raising or lowering the ends of the ladder independently or simultaneously, means for moving one end of the ladder laterally and oscillatory about the point of suspension of the other end of the ladder and means for moving the ladder across the ditch to vary the width of the ditch.

69. In an excavating machine, the combination with a face digging bucket ladder having one tumbler end nearest the point of dumping of the buckets, of means for raising or lowering the ends of the ladder independently or simultaneously, means for moving one end of the ladder laterally and oscillatory about the point of suspension of the other end of the ladder and means for moving the ladder longitudinally of the ditch to vary the length of the ditch.

70. In an excavating machine, the combination with a face digging bucket ladder having one tumbler end nearest the point of dumping of the buckets, of means for raising or lowering the ends of the ladder independently or simultaneously, means for moving one end of the ladder laterally and oscillatory about the point of suspension of the other end of the ladder, means for moving the ladder across the ditch to vary the width of the ditch, and means for moving the ladder longitudinally of the ditch to vary the length of the ditch.

71. In an excavating machine, the combination with a face digging bucket ladder having the upper tumbler end nearest the point of dumping of the buckets, of means for raising and lowering the ends of the ladder independently or simultaneously and means for moving the lower end of the ladder laterally or oscillatory about the upper point of suspension of the ladder.

72. In an excavating machine, the combination with a face digging bucket ladder having the upper tumbler end nearest the main supporting body of the machine, of means for raising and lowering the upper end of the ladder independently or simultaneously, an endless series of buckets mounted on rollers arranged to run in rigid guides, secured to the ladder whereby the buckets are held to the work rigidly, and means for moving the lower end of the ladder laterally or oscillatory about the upper point of suspension of the ladder.

73. In an excavating machine, the combination with a face digging bucket ladder having the upper tumbler end nearest the point of dumping of the buckets, of means for raising and lowering the ends of the ladder independently or simultaneously, an endless series of buckets mounted on rollers arranged to run in rigid guides, secured to the ladder, and means for moving the lower end of the ladder laterally or oscillatory about the upper point of suspension of the ladder.

74. In an excavating machine, the combination with a face digging bucket ladder, of means for raising or lowering the lower end of the ladder oscillatory about the upper point of suspension of the ladder, means for raising and lowering the upper end of the ladder, a rigid guide for the upper end of the ladder, and means for sluing the ladder.

75. A conveyer having a section of its side wall adapted to be swung diagonally across the face of the conveyer belt and thus to scrape and guide the conveyed material from the belt and discharge it through the side opening provided by such opened section.

76. In an excavator, the combination with a conveying bridge, of rollers for the ends of the bridge to enable it to be bodily moved longitudinally of the ditch, a carriage adapted to travel on the bridge transversely of the ditch, an endless drive including a chain, cable or the like, extending from end to end of the bridge, propelling mechanism for the trucks operated by said endless drive, and means controllable from the carriage when in any position for operating said endless drive to move the bridge.

77. In an excavating machine, the combination with a face digging bucket ladder, of means for moving the ladder across the ditch to vary the width thereof, means for moving the ladder longitudinally of the ditch to vary the length thereof and means for sluing the ladder.

In witness whereof, I have hereunto subscribed my name in the presence of two witnesses.

FRANCIS M. JOHNSON.

Witnesses:
 W. PERRY HAHN,
 C. L. HOPKINS.